(12) United States Patent
Miner et al.

(10) Patent No.: US 9,825,849 B2
(45) Date of Patent: Nov. 21, 2017

(54) ROUTING TRAFFIC FOR APPLICATIONS BY A SOFTWARE ROUTER CO-RESIDENT IN APPLICATION MEMORY SPACE OF A GENERAL PURPOSE COMPUTER

(71) Applicant: Cisco Technology, Inc., San Jose, CA (US)

(72) Inventors: James J. Miner, Morrisville, NC (US); Ronald W. Taylor, II, Morrisville, NC (US); Stan Ratliff, Raleigh, NC (US); Edward Paradise, Cary, NC (US); Walter L. Robinson, Sunnyvale, CA (US); Darryl L. Satterwhite, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1112 days.

(21) Appl. No.: 13/888,548

(22) Filed: May 7, 2013

(65) Prior Publication Data
US 2014/0122727 A1      May 1, 2014

Related U.S. Application Data

(60) Provisional application No. 61/721,272, filed on Nov. 1, 2012.

(51) Int. Cl.
*G06F 15/173* (2006.01)
*H04L 12/771* (2013.01)
(Continued)

(52) U.S. Cl.
CPC .............. *H04L 45/56* (2013.01); *H04L 45/60* (2013.01); *H04L 67/12* (2013.01); *H04W 4/046* (2013.01);
(Continued)

(58) Field of Classification Search
CPC ....................................................... H04L 45/56
(Continued)

(56) References Cited

U.S. PATENT DOCUMENTS 5,832,219 A * 11/1998 Pettus ..................... G06F 9/547
                                                    709/203
6,510,164 B1    1/2003 Ramaswamy et al.
(Continued)

OTHER PUBLICATIONS

Rosenberg, "A Framework for Application Interaction in the Session Initiation Protocol (SIP)," draft-ietf-sipping-app-interaction-framework-05, SIP, Internet—Draft, Jul. 18, 2005, pp. 1-39.
(Continued)

*Primary Examiner* — Jason Recek
(74) *Attorney, Agent, or Firm* — Edell, Shapiro & Finnan, LLC

(57) ABSTRACT

The embodiments described herein provide mechanism that allows an embedded router software image and an application to run in the user application memory space of a general purpose computer. A connection is established with an operating system device configured to route packets between the application and the software router and route, by the software router, network traffic to and from the application by way of the connection. The application may be connected to other applications in the user application memory space or connected to applications that are external to the general purpose computer.

20 Claims, 7 Drawing Sheets

(51) Int. Cl.
*H04W 4/04* (2009.01)
*H04L 12/773* (2013.01)
*H04L 12/26* (2006.01)
*H04L 29/08* (2006.01)
*H04L 12/24* (2006.01)

(52) U.S. Cl.
CPC ....... *H04L 41/0803* (2013.01); *H04L 43/0811* (2013.01); *H04L 67/34* (2013.01)

(58) Field of Classification Search
USPC .......................................................... 709/238
See application file for complete search history.

(56) References Cited

U.S. PATENT DOCUMENTS

| | | | | |
|---|---|---|---|---|
| 8,743,735 | B1* | 6/2014 | Bershteyn | H04L 43/50 370/254 |
| 2001/0044841 | A1* | 11/2001 | Kosugi | H04L 41/069 709/223 |
| 2002/0138393 | A1* | 9/2002 | Tatge | G06Q 30/08 705/37 |
| 2005/0013298 | A1* | 1/2005 | Srisuresh | G06F 15/16 370/392 |
| 2008/0091815 | A1* | 4/2008 | Rao | G06F 8/65 709/223 |
| 2008/0263223 | A1* | 10/2008 | Degenaro | H04L 67/327 709/238 |
| 2010/0269167 | A1* | 10/2010 | Kashima | G06F 21/31 726/7 |
| 2012/0079118 | A1* | 3/2012 | Bailey | H04W 4/001 709/227 |
| 2012/0102576 | A1 | 4/2012 | Chew | |
| 2012/0246704 | A1 | 9/2012 | Dorsey et al. | |
| 2013/0254264 | A1 | 9/2013 | Hankinson et al. | |
| 2013/0272216 | A1* | 10/2013 | Riggio | H04W 72/04 370/329 |
| 2014/0122678 | A1 | 5/2014 | Miner et al. | |

OTHER PUBLICATIONS

Netronome, "Scaling Network Appliance Performance," Netronome White Paper, www.netronome.com, Apr. 2011, pp. 1-6.

\* cited by examiner

ROUTING TRAFFIC FOR APPLICATIONS BY A SOFTWARE ROUTER CO-RESIDENT IN APPLICATION MEMORY SPACE OF A GENERAL PURPOSE COMPUTER

CROSS REFERENCE TO RELATED APPLICATION

This application claims the benefit of U.S. Provisional Patent Application No. 61/721,272, filed Nov. 1, 2012, the entirety of which is incorporated herein by reference.

TECHNICAL FIELD

The present disclosure relates to routing traffic for applications by a software router, where both the applications and software router co-located or co-resident in user application memory space of a multi-purpose computing device.

BACKGROUND

Mobile devices may travel together in groups, e.g., when users of the mobile device are traveling in an automobile, airplane, or other vehicle. The mobile devices receive voice and data by way of a wireless service provider such as AT&T™ or VERIZON™, or by satellite. When the mobile communication device is a dedicated component in the vehicle, the vehicle may be referred to as a "connected vehicle." In such environments, each mobile device in the vehicle may communicate by way of the dedicated component which itself has a dedicated communication channel for communication with a roadside unit, a cellular base station, or satellite. These techniques may be applied to, e.g., police and fire fighting teams that may require mobile or portable connectivity to a network such as the Internet. Such emergency teams may also employ wired or wireless connections within an on-site command post.

In the above-described environments, it may be desirable to use a limited number of connections, e.g., one or two, to provide network connectivity to various individuals in a collection of users such as a firefighting team or airline passengers aboard a flight. In order to provide network connectivity when the number of users exceeds the number of physical network connections special, software and/or hardware may be needed. However, specialized software and hardware require expensive customizations that are not readily deployable when compared to off-the-shelf software and hardware.

DESCRIPTION OF EXAMPLE EMBODIMENTS

Overview

The embodiments described herein provide a mechanism that allows an embedded router software image to run in the user application memory space of a general purpose computer. In addition, co-located or locally connected applications, referred to herein as "co-resident applications" are resident with the software router application in the user application memory space of a general purpose computer. The software router routes network traffic to/from the co-resident applications and an external network or between co-resident applications. A software router-to-application connection process is provided to connect applications to the software router. After the connection is established, the software router route packets to and from applications. The connection may use hooks or library functions that allow the connection to access the operating system's (OS's) protected or kernel memory space of the general purpose computer, thereby allowing access to the OS protocol stack. The connection appears as any other network interfaces available on a general purpose computer.

The techniques described herein provide for operating a software router in application memory space of a general purpose computer, where the software router is configured to route network traffic between applications operating in the application memory space, and between the application and network interfaces external to the general purpose computer. For example, an application is operated in the application memory space of the general purpose computer. A connection is established with an operating system software "device" configured to route packets between the application and the software router. Software operating in the kernel that emulates physical hardware is commonly referred as a "device," since it appears to software operating the application space as a hardware device. Network traffic is routed by the software router for network traffic to and from the application by way of the connection.

The general purpose computer is in communication with one or more of a local area network (LAN), a mobile LAN, personal area network (PAN) and a wide area network (WAN) to provide a flexible communication architecture for operating a software router, whether or not any of the network connections of the general purpose computer are wired or wireless.

Example Embodiments

Figure 1:
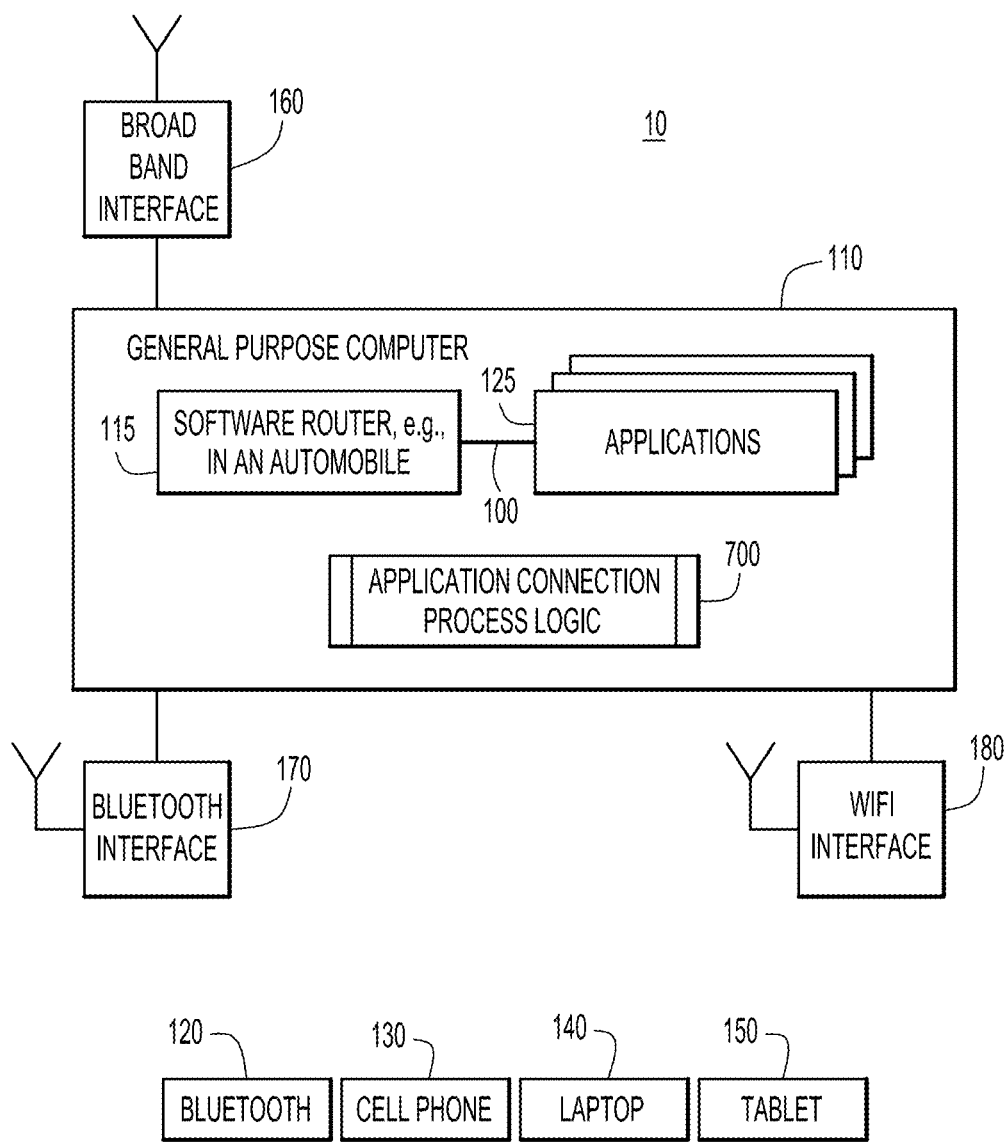
FIG. 1 is a high level diagram showing a vehicle with a general purpose computer and a software router servicing a plurality of co-resident applications that may be associated with a plurality of mobile devices traveling together in a vehicle.

Referring first to FIG. 1, a device level block diagram is shown comprising vehicle 10 that may be providing transport for a plurality of users or passengers, e.g., a car, train or airplane. Vehicle 10 includes a general purpose computer (GPC) 110, and a plurality of interfaces, e.g., a broadband interface 160, a Bluetooth® interface 170, and a WiFi® interface 180. GPC 110 executes a software router 115 and a plurality of applications 125. The software router 115 may be running on any general purpose computer, e.g., a small form factor personal computer (PC) running Linux or the Windows® OS with one or more wireline or wireless network interfaces, e.g., interfaces, 160, 170, and 180.

Interfaces 160, 170, and 180 need not be part of the GPC 110, but may be interfaces that are external to GPC 110.

The software router 115 services a plurality of mobile devices traveling together in vehicle 10. For example, software router 115 routes packets to and from a Bluetooth device 120, cell phone 130, laptop 140, and/or personal tablet device 150. Software router 115 routes packets to and from applications 125 and devices in vehicle 10, as well as to networks external to vehicle 10. In this manner, software router 115 enables a mobile WLAN with router capability that is similar to home or office WLAN functionality to be formed inside in vehicle 10.

In one example, a service provider such as AT&T™ or VERIZON™ provides broadband services by way of broadband interface 160. Such services may include voice and data services. Handoff messages in the service provider network may include information that may be used to identify network control information for individual vehicles and their transition from one server or station to another. For example, a mobility handoff message may include information comprising a Virtual Local Area Network (VLAN) identifier (ID), or a unique network ID (e.g., a bridge domain ID). In this regard, mobile devices 120, 130, 40, and 150 may be part of a VLAN or Virtual Private Network (VPN) that is facilitated by the features included in software routers 115.

Furthermore, by using a router software image that was developed for an embedded router, router technology developed over decades is leveraged for mobile WLANs and for operation on a general purpose computer. For example, the latest in VPN, VLAN, Quality of Service (QoS), network security, aggregation services, integrated services, etc., technology of an embedded router becomes deployable on a general purpose computer with little or no modification of the embedded router software image for a specific or custom piece of hardware. For example, minimal modification may include a software image build for a specific processor suite such a commonly used x86 or reduced instruction set processors. The software router build can therefore be distributed as a binary executable without divulging the source code developed over decades. The software router and applications may be operated as a virtual machine (VM), e.g., via a hypervisor.

To facilitate the user experience or perform other services, a plurality of applications 125 may be running on the GPC 110 in addition to the software router 115. These applications 125 may avail themselves of features that are available by way of software router 115 and vice versa. For example, one of the applications 125 may provide parental controls in order to provide safe browsing for a passenger accessing the Internet, e.g., using tablet 150, or data acceleration services. In this regard, applications 125 that are co-resident with software router 115 in application memory space of GPC 110 may be referred to herein as locally connected applications or externally connected applications.

The term "locally connected applications" is used herein to refer to applications running in the Linux (or other) host that can communicate with the software router. Locally connected applications can perform certain management and data path functions through an API to the software router. For example, the locally connected applications may provide data acceleration by way of data compression techniques, or may provide data encryption and decryption services. On the other hand, the term "externally connected applications" is used herein to refer to applications running in the Linux host that communicate with external hosts or devices, but are constrained to use the software router as the next hop to reach any of those external hosts. In order to connect the applications 125 with the software router 115, a connection 100 is provided, e.g., a network layer 2 kernel device that connects to the OS protocol stack. To establish connection 100, GPC 110 executes application connection process logic 700 (explained further below).

Since the router software image was developed for an embedded device, the executing router software image "expects" to have certain hardware interfaces be available for operation. To this end, a router software wrapper or co-executing interface process is executed to simulate, mimic, or otherwise serve in lieu of such "expected" hardware interfaces. The operation of the interface process is described in detail in related U.S. application Ser. No. 13/827,550, filed Mar. 14, 2013.

In other examples, the software router 115 may service a plurality of mobile devices that are part of a tactical unit. The software router 115 routes packets for tactical units; not necessarily at the same time or in the same geographic region. Tactical units may be a small military unit, e.g., two ground platoons, or the tactical unit may be an emergency response team that has police units, firefighter units, and/or a medical team.

Figure 2:
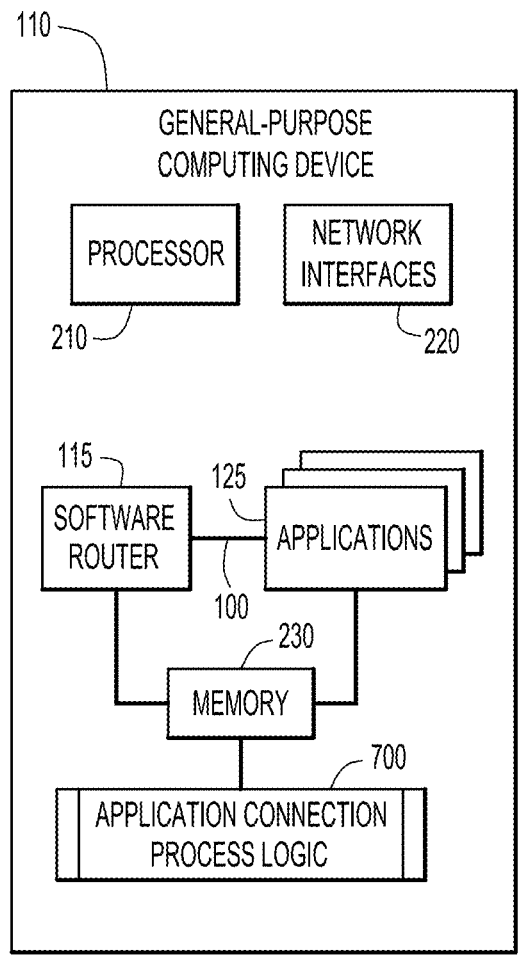
FIG. 2 is an example block diagram of a general purpose computer running a software router, co-resident applications, and an application connection process.

Turning now to FIG. 2, an example of a block diagram of a multi-purpose or general purpose computer 200 configured to execute a software router, e.g., software router 115, and one or more applications, e.g., applications 125; and executes application connection process logic 700. The diagram of FIG. 2 is representative of the general structure of any computer, e.g., associated with vehicles or tactical units described in connection with FIG. 1, e.g., GPC 110. The general purpose computer 200 comprises a processor 210, memory 230, and a network interface device(s) or unit(s) 220 (e.g., wireline network and RF interfaces). The network interface device 220 sends and receives packets from the various user devices, e.g., operating within vehicle 10 using an RF interface. Accordingly, interface device 220 may employ wireless local area network (WLAN) or wireless wide area network (WWAN) technology, e.g., 3 G, 4 G, EDGE, LTE, etc., and may also employ standard wired Ethernet network connectivity. The processor 210 is, for example, a microprocessor, microcontroller, digital signal processor or other similar data processor configured for a general purpose computer.

The memory 230 may comprise read only memory (ROM), random access memory (RAM), magnetic disk storage media devices, optical storage media devices, flash memory devices, electrical, optical, or other physical/tangible (non-transitory) memory storage devices. The memory 230 stores executable software instructions for application connection processes logic 700. Plural processes may be employed to encompass the native software router process(es) and any other interface or wrapper application or process that facilitates the routing of packets in and out of the general purpose computer 200. Thus, the memory 230 may comprise one or more computer readable storage media encoded with software comprising computer executable instructions and when the software is executed operable to perform the operations described herein for the process logic 700.

The processor 210 executes the process logic 700 in order to provide routing services for applications 125 and other associated equipment, e.g., mobile device in vehicle 10 or endpoints external to vehicle 10. The software router 115 is executed by the general purpose computer, based on router software source code developed for an embedded device, where the router software source code is not modified for operation on the general purpose computer 200. Applications 125 are also executed by processor 210 without modification. Process logic 700 has been described generally above in the context of a few specific use-case scenarios and will be described with specific examples of operational details in connection with FIGS. 5-7.

Figure 3:
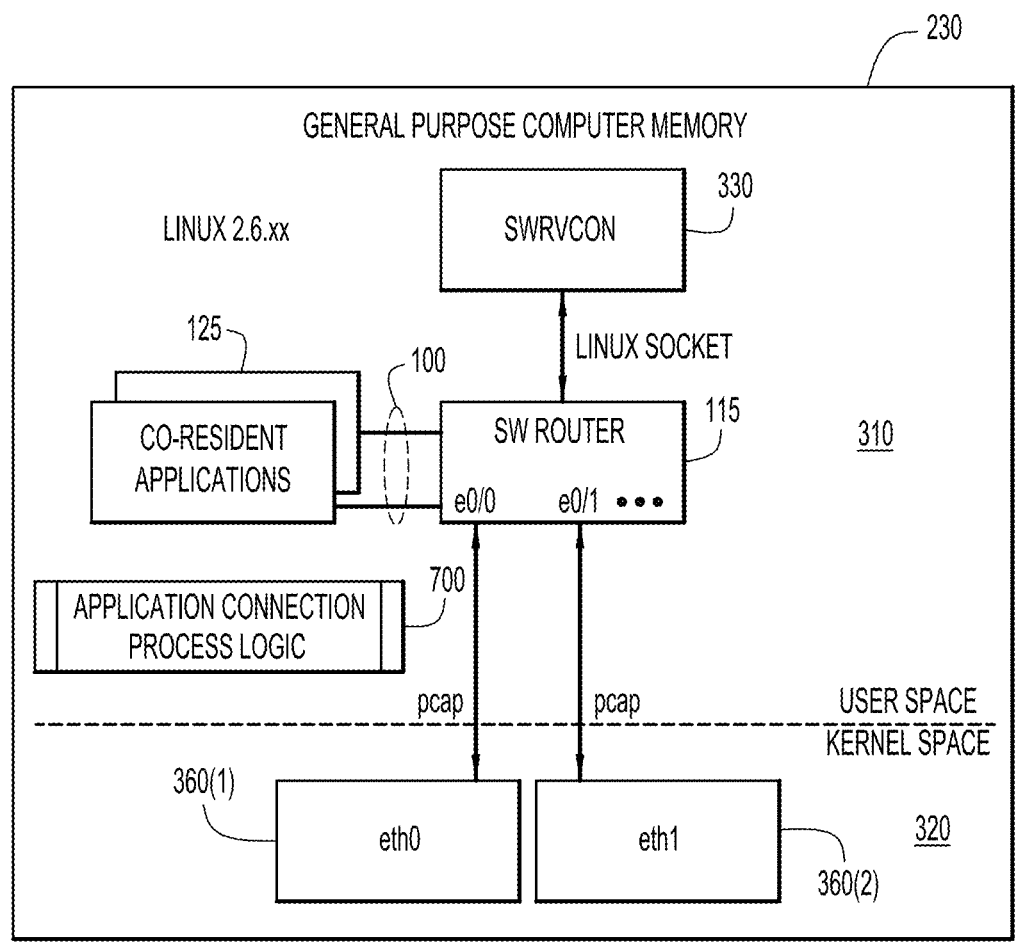
FIG. 3 is an example block diagram of software and interface components that may be used by the software router running on a general purpose computing device.

The basic operational environment for the techniques described herein has been described above and the next level of detail is provided by way of FIG. 3. FIG. 3 shows the software router 115 (FIG. 1) and other components that are stored, e.g., in memory space 230 from FIG. 2 for a system housed in a vehicle, portable device, or general purpose computer, e.g., general purpose computer 200 that may use a processor with the Intel x86 architecture, and employs a generic OS such as Linux or proprietary OS such as Windows. In this example, the OS is Linux version 2.6 or greater, indicated as 2.6.xx in FIG. 3. Memory 230 is divided by the OS into a user or application memory space 310 and a protected (by the OS) or kernel memory space 320.

Within the user memory space 230 are a software router virtual console (SWRVCON) process 330, a software router 115, user space applications 125, and process logic 700. Software router 115 may be ported from a traditional embedded router device, e.g., manufactured by Cisco™, 3Com™, D-link™, SMC™, Intel™, etc., that may be used in home, office, or data center applications. The console 330 is a small user space application that is delivered as part of the software router software distribution package that is released to a system integrator (SI) that ultimately provides a router hardware and software package for installation, e.g., in an automobile. The console 330 can be executed in a Linux shell/console to provide the SI with local console access to the software router application 115. The console application 330 communicates with the software router 115 using, e.g., a standard Linux or UNIX domain sockets.

Given that the image used for the software router 115 is designed for an embedded device, it has interfaces that "expect" native hardware. In this example, the interfaces are enumerated as eth0 and eth1, etc., for which a packet capture (pcap) library (pcaplib) may be provided in order to emulate the hardware interface expected by software router 115. The pcaplib has pcap and packet inject (pinject) function calls to obtain packets (ingress) from the network and inject packets (egress) back into the network. However, both pcap and pinject have limitations when used in connection with co-resident applications 125. In this example, an interface with the OS's kernel memory space 320 that includes Ethernet interfaces 360(1) and 360(2), labeled eth0 and eth1, respectively, is shown. It should be noted that various configuration and options files can be stored on the general purpose computer, e.g., for console command line options, memory configuration, startup scripts, etc.

In order facilitate inter-application communication one or more OS network tap (TAP) interfaces may be instantiated for connection 100, e.g., the Linux OS supports TAP which operates as a network tap for virtual networking. In essence, the TAP interface simulates a link layer device on the OS kernel and operates at the layer 2 level, e.g., the Media Access Control (MAC) layer, on one end and at the layer 3 level on the other end, e.g., for IP traffic. TAP can be used as a pipe or tunnel between the externally connected applications and the software router for inter-application network traffic. Accordingly, from the point of view of the co-resident application, the TAP interface looks like a layer 3 endpoint on which the application may send packets, and from the point of view of the software router, the TAP interface looks like a layer 2 network interface. TAP may also be used to facilitate the networking operations described herein that are external to the general purpose computer.

As used herein, the terms "application," "routine," "process," "module," and "thread," may refer to a stand alone software application or process, or a functional unit thereof. These terms may be used interchangeably and refer to operations generally performed in software.

One issue with using a pcap interface with co-resident applications is that traffic that is to be routed from the software router 115 to one of the co-resident applications 125 is not actually returned to the designated co-resident application. Instead, the traffic is routed onto the attached network instead of passing back up through the Linux protocol stack as intended. By way of example, instead of traveling from software router 115 to an application 125, packets are routed out through one of the Ethernet interfaces 360(1) and 360(2). This limitation is both inherent and intentional in the design and operation of the pcap interface. Given the pcap limitations, an OS TAP interface can be implemented to achieve the desired connectivity.

Figure 4:
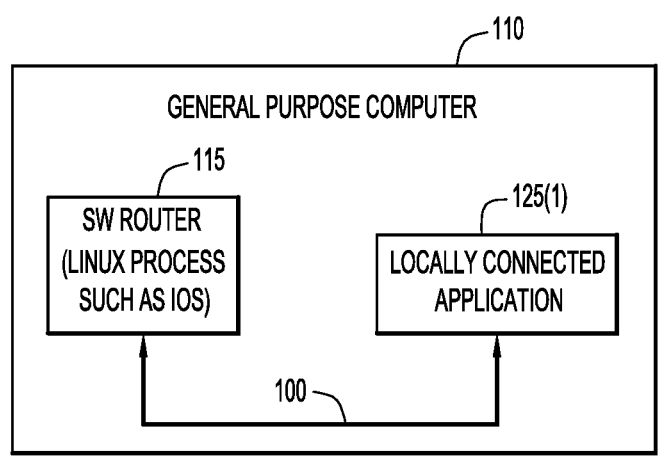
FIG. 4 is a block diagram of the software router and one of the plural co-resident applications depicted in FIG. 3.

Example operations of a Linux process, e.g., software router 115 and a locally connected application, e.g., locally connected application 125(1) are briefly described in connection with FIG. 4. Software router 115 and locally connected applications 125 are running in GPC 110 and are connected by a network device in the OS kernel, e.g., TAP device or interface 100 is depicted as a pipeline or connection. The connection from software router 115 to TAP device or connection 100 may be referred to as a "raw" layer 2 interface, e.g., an Ethernet interface, while the connection from locally connected application 125(1) to TAP connection 100 may be referred to as a "cooked" layer 3 interface, i.e., and IP interface.

Thus, a TAP interface is an OS, e.g., Linux, mechanism that creates a communication tunnel or pipe. At one end of the pipe, the cooked side, the pipe connects to a user/application space process, whereby layer 3 packets can be received and sent. The other end of the pipe, the raw side, appears to the software router as a network interface that is like any other network layer 2 interface. Packets travelling through this end go through the Linux protocol stack. The cooked side can be assigned an IP Address. Applications can send and receive data through the cooked side via standard TCP/UDP socket operations.

The "raw" interface:
Appears to the software router 115 as a Linux character device, i.e., not like a disk or network interface
Exchanges data is in the form of raw Ethernet frames
The software router 115 can send and receive raw Ethernet frames using standard read( )/write( ) system calls
The "cooked" interface:
Appears to the locally connected application 125(1) as an ordinary application network interface
Can assign the connection 100 an IP address
Behaves as a standard socket endpoint such that the locally connected application 125(1) uses standard send and receive socket calls
Connection 100:
Is managed by the OS, e.g., Linux or Windows
Essentially forms a virtual network within the GPC 110 (FIG. 1)
Is not connected to physical networks, but connects to the software router on the raw side and through the OS protocol stack on the cooked side
The TAP interface may be configured in the software router process by adding an entry to a configuration file associated with the software router, e.g., a network map file.

The entry enables the software router to allocate internal data structures that enable a network interface in the software router.

On GPC's OS an installation script can be used during a start or boot sequence of the GPC, in order to create the TAP interface. An example script may use the following basic Linux commands:

ip tuntap add dev $1 mode tap
ip addr add $2/$3 dev $1
ip route add default $4 where $1 is the name of the TAP interface, such as, for example, "tap0", $2 is the IP Address to be assigned, $3 is the subnet mask, and $4 is the IP address of the software router on its TAP interface. These commands create the TAP interface and give it a permanent persistent presence in the Linux space.

Figure 5:
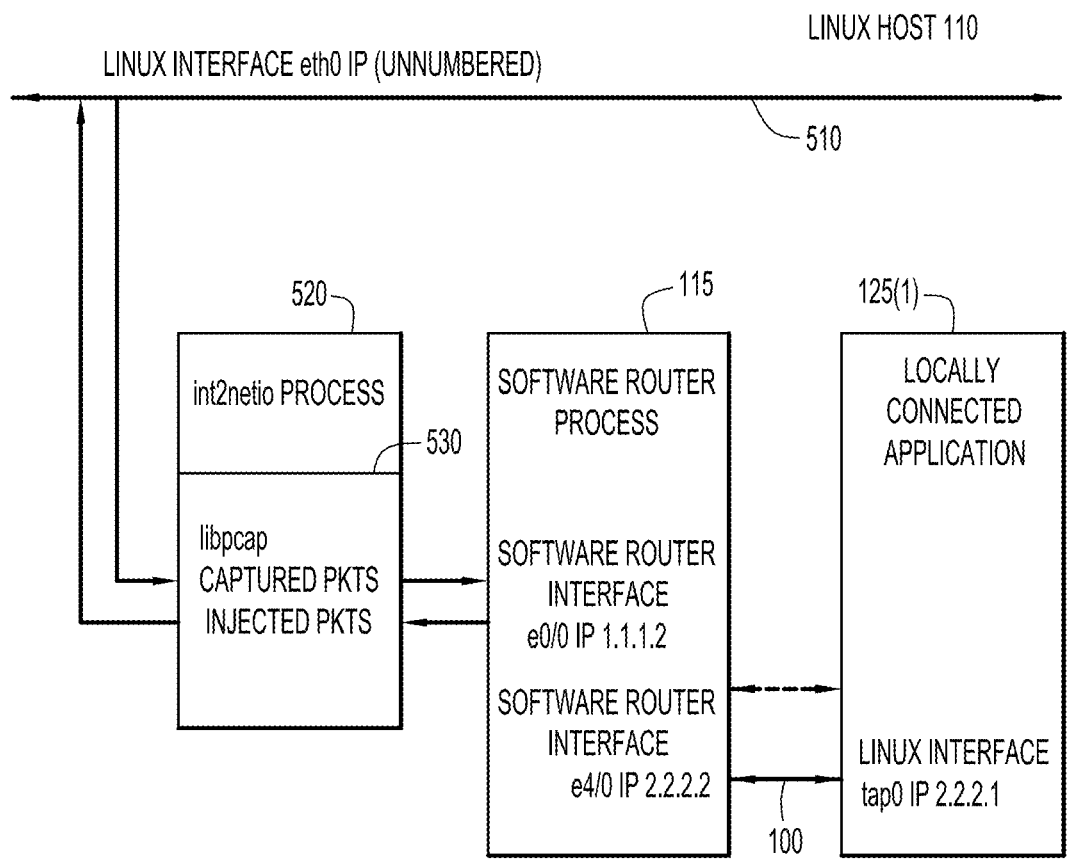
FIG. 5 is a block diagram of software components used to facilitate communication between the software router and a locally connected co-resident application.
Figure 6:
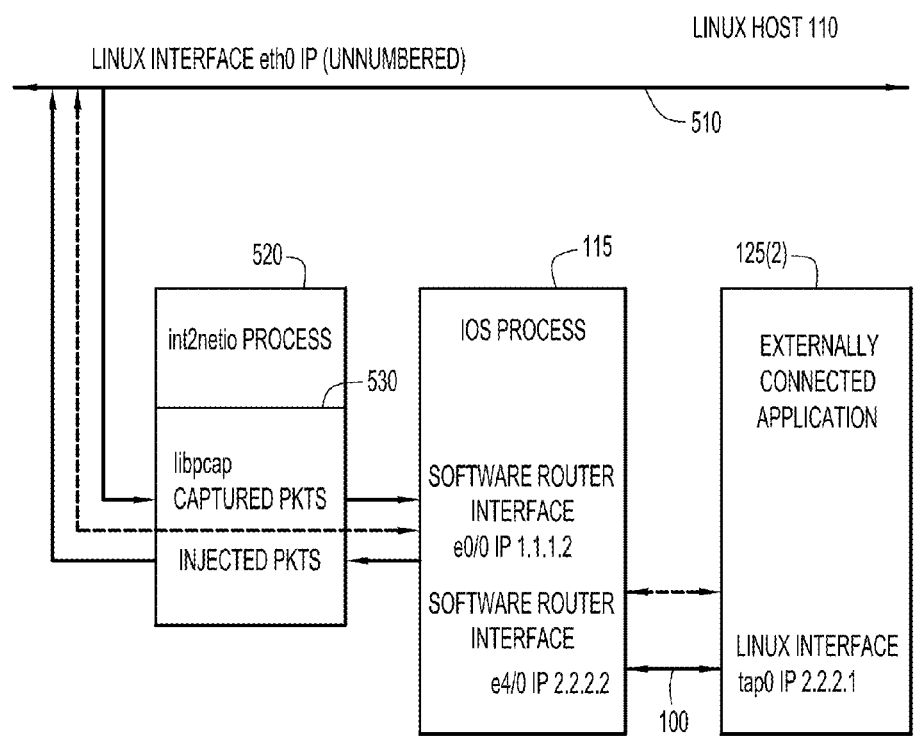
FIG. 6 is a block diagram of software components used to facilitate communication between the software router and an externally connected co-resident application.

Turning now to FIGS. 5 and 6 operations regarding connection 100 are described for locally connected applications and externally connected applications, respectively. FIG. 5 depicts a Linux host, e.g., GPC 110. The host 110 has an Ethernet interface 510 operating in OS or kernel memory space. Interface 510 is listed as an "unnumbered" interface for reasons described hereinafter. Also operating in kernel memory space is a standard network interface process 520, e.g., int2netio, the interfaces with a kernel to application memory space process that utilizes libpcap (pcap and pinject) process 530, as described above.

In this example, the TAP interface 100 (tap 0 as viewed in the figure), or pipe, is assigned an IP address of 2.2.2.1 on the cooked end associated with the locally connected application, e.g., locally connected application 125(1), and an IP address of 2.2.2.2 on the raw end associated with the software router, e.g., software router 115. To communicate directly with the router, e.g., for maintenance or service, the locally connected application 125(1) generates requests addressed to IP Address 2.2.2.2. As viewed by the OS, the software router process 115 appears as an external IP endpoint on the same subnet. More specifically, internal to the SW Router, interface e0/0 is assigned an IP address of 1.1.1.2, and interface e4/0 is assigned an IP address of 2.2.2.2. Accordingly, e4/0 with IP address 2.2.2.2, is the direct connection to the Linux interface tap0 with the IP address 2.2.2.1. By virtue of their addresses 2.2.2.1 and 2.2.2.2, e4/0 and tap0 are on the same subnet. The OS can send and receive IP datagrams to and from the software router process. As such, any issue associated with the use of pcap (and libpcap) is avoided, even though network I/O and libpcap may still be employed for connectivity external to GPC 110.

The Linux interface eth0 is unnumbered (i.e., no IP Address assigned). Unnumbered interfaces can be made available for all interfaces of the general purpose computer, with the exception of TAP. The TAP interface uses an assigned IP address for OS network operations. The TAP interface may also be assigned a default route that points to the software router. The default route may be configured into the OS of the general purpose computer designating the TAP interface and the software router as the next hop for any network traffic leaving the OS network stack. The combination of unnumbered interfaces and the default route ensures that the OS will not choose an alternate path for packet flow between locally connected or externally connected applications and the software router. In other words, the only connection path for applications to communicate network traffic is by way of the software router, i.e., the applications "see" the software router as the only exit point for IP traffic.

The above scheme defines an IP subnet that is internal to the GPC. The system integrator plans the networking scheme according to the description above in order to ensure the IP address space supports this internal subnet. If private addresses are used, then some form of network address translation (NAT) may be configured within the software router. NAT works for both locally connected applications and externally connected applications. Example connectivity for externally connected applications is described below.

Referring now to FIG. 6, data flows for an externally connected application are described. The TAP interface 100 is the only IP interface available to the externally connected application, and by way of the default route that points to the software router, all data flows pass through the software router for routing. Furthermore, these techniques do not require any modification of the co-resident applications, although some application modifications may be employed. As in FIG. 5, FIG. 6 depicts a Linux host, e.g., GPC 110. The host 110 has an Ethernet interface 510 operating in OS or kernel memory space. Interface 510 is unnumbered. Also operating in application memory space is a standard network interface process int2netio 520 that interfaces with libpcap 530. In turn, libpcap 530 interfaces with a kernel to application memory space support process that facilitates pcap and pinject, as described above. In this example, the TAP interface 100, or pipe, is assigned an IP address of 2.2.2.1 on the end associated with the externally connected application, e.g., externally connected application 125(2), and an IP address of 2.2.2.2 on the end associated with the software router, e.g., software router 115. To obtain router service, the locally connected application 125(2) generates requests addressed to IP Address 2.2.2.2. As viewed by the OS, the software router 115 process appears as an external IP endpoint on the same subnet.

Note that IP addresses exist in both the software router space, and in the Linux space. In the Linux space, the only IP Address assigned is for the Tap interface. There is no IP Address assigned in the Linux space to any of the physical interfaces. Within the software router, IP Addresses are assigned to both its e0/n interfaces (representing physical interfaces to the outside world), and to its e4/0 interface (representing its interface to the Linux endpoint). IP Addresses assigned within the software router space are not visible to the Linux OS. One exception is that the Linux OS can execute the Address Resolution Protocol (ARP) to determine the presence of the TAP interface.

The default route in place in the Linux memory space, e.g., memory 230, essentially specifies that the TAP interface is the only way to exit the Linux memory space by way of the software router, and that the software router is the next hop for all packets going out of the box, e.g., GPC 110.

Figure 7:
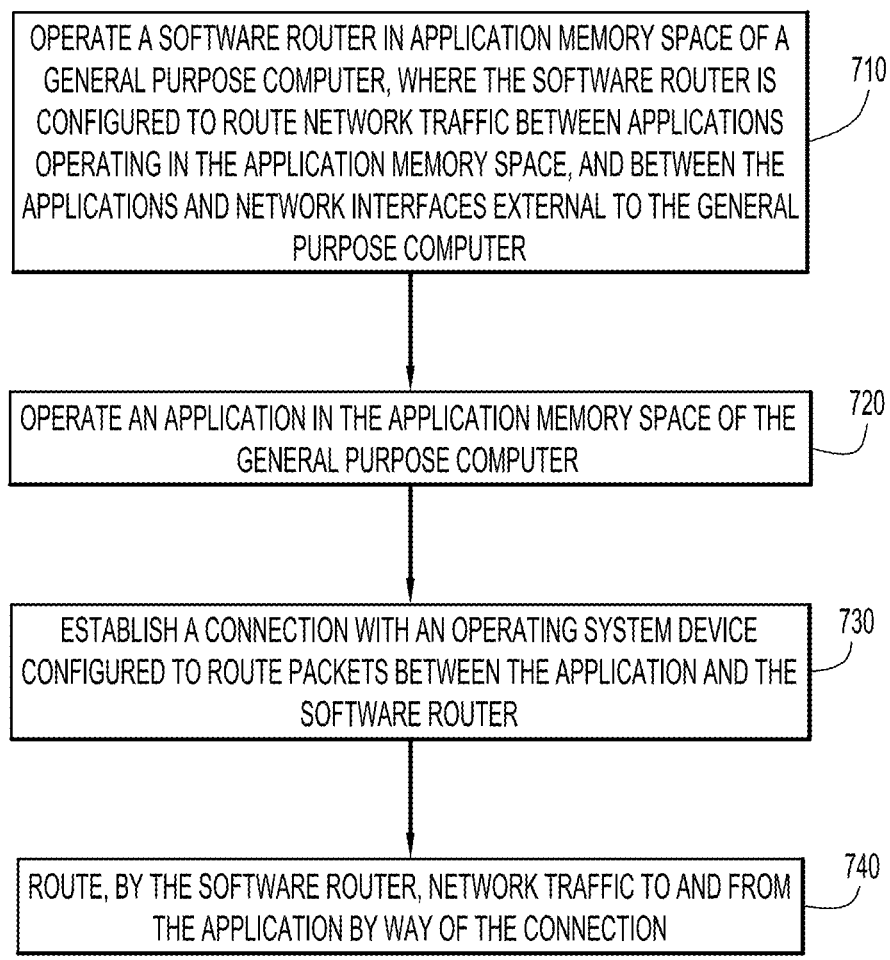
FIG. 7 is an example flow chart of a general process for routing traffic for co-resident applications by a software router on a general purpose computer.

Turning now to FIG. 7, an example process flow chart is described for connecting applications to a software router on a general purpose computer, e.g., by way of application connection processes logic 700. At 710, a software router is operated in application memory space of a general purpose computer, where the software router is configured to route network traffic between applications operating in the application memory space, and between the application and network interfaces external to the general purpose computer. The software router can also act as a router for attached devices and the Internet. At 720, an application is also operated in the application memory space of the general purpose computer. At 730, a connection is established, e.g., a TAP connection, with an operating system device configured to route packets between the application and the software router. At 740, network traffic is routed by the software router for network traffic to and from the application by way of the connection.

The software router is, in general, designed for operation on an embedded device and is not reconfigured for operation on the general purpose computer. The application may be designed for operation on the general purpose computer and is also not modified.

In order facilitate and support co-resident applications, maintenance, control, debugging, and test features can be added to the software router and co-resident application installation packages. A first of such features is support for crash recovery. When an application or the software router encounters a fatal error or "crash," e.g., during development or after sale to the end user, the developing engineers, test engineers, or customer support personnel employ mechanisms for determining the root cause of the problem such a software defect or bug. Well designed software produces a dump file or crash file. The dump file allows a software debugger to diagnose the root cause of the problem or provide a software trace back mechanism to trace through the software routines and examine the state of software variables.

Typically, a software failure may result from a memory leak, an uninitialized pointer, or coded infinite loops, among other failures, depending upon the processing environment. For example, router software typically runs on an embedded system using a real-time OS that protects both memory partitions and threads, while GPCs are generally event driven and do not have a tightly controlled application memory space, and as such rely on the software developer to provide proper memory management in the application memory space.

Accordingly, crash dump file support may be added to the software router and the co-resident applications. For example, a Linux crashinfo signal handling is linked to the software router's IOS crashinfo infrastructure. The software router utilizes standard operating system mechanisms to enable callbacks when crashes occur. This enables crash dump software in the software router to collect information in order to document the crash, such as register and memory dumps.

The signal handling infrastructure hooks the various Linux error signals. These signal handlers cause the invocation of the software router's crash file generation routines. Hooks may be added to enable the collection of back trace information on each running thread. In one example, a crash file collection process comprises providing GPC platform calls to hook registries within the software router for crashinfo support and providing platform specific routines for some of the support services.

Another feature to facilitate and support co-resident applications, maintenance, control, and debugging can be to provide remote management connectivity. Standard remote management techniques may be employed. A common remote management technique is Simple Network Management Protocol (SNMP). For SNMP, a TAP interface may be employed that can be mapped to a virtual Ethernet port on the router application. In one example, the TAP interface enables SNMP connectivity from co-resident applications to the software router. In SNMP nomenclature, the entity being managed is referred to as the "agent", e.g., a router or application, whereas the entity doing the managing is referred to as the "client", e.g., the SNMP client. Thus, the SNMP client sends management requests or commands to the SNMP agent.

The TAP interface allows SNMP clients to be mapped "→" to agents in a plurality of combinations. For example, any of the SNMP configuration combinations shown in Listing 1 may be employed. A first set of three combinations is shown for an external SNMP client and second set of five combinations is shown for a co-resident SNMP client:

Listing 1 SNMP Client to Agent Mapping

```
#External client mapped to co-resident app (agent) via router
> external client -> router -> co-resident app
#External client mapped to router
> external client -> router
#External client mapped to co-resident app (agent) no router
> external client -> co-resident app
#Co-resident client mapped to router
> co-resident client -> router
#Co-resident client mapped to co-resident app
> co-resident client -> co-resident app
#Co-resident client mapped to external agent
> co-resident client -> external agent
#Co-resident client mapped to external agent via router
> co-resident client -> router -> external agent
#Co-resident client mapped to co-resident app via router
> co-resident client -> router -> co-resident app
```

In Listing 1, an "external client" refers to an SNMP client that resides outside of the GPC. A "co-resident client" refers to an SNMP client that resides within the GPC, i.e., a co-resident client is a co-resident application that acts as a SNMP client. The above combinations allow for SNMP specific data flows that must pass through the router, bypass the router, or both for egress out of any external interface, either within vehicle 10 or to the external support network that is enabled by the service provider.

A third feature to facilitate and support co-resident applications, maintenance, control, and debugging can be to provide remote console access, which is different from a Management Information Base (MIB) browser enabled via SNMP. Console access may be achieved by way of configuration options to provide for console access to both the router and the applications either via an external interface or a virtual internal interface. The console is one means of managing the SW Router; the user/administrator enters character-based command lines and the SW Router answers with character-based messages. Console access may be achieved via the SWRVCON program, e.g., SWRVCON 330 (FIG. 3). SWRVCON 330 allows administrators to connect to the software router console to issue commands and observe console output for maintenance purposes. Alternatively, console access may be achieved using the Telnet client-server protocol, or the Secure Shell (SSH) cryptographic network protocol, in order to establish and conduct a maintenance session.

Another feature to facilitate and support co-resident applications, maintenance, control is a startup and shutdown processes. For this feature, scripts may be provided that allow for controlling when and in what order the router starts up and shuts down when the underlying Linux installation and its co-resident applications start up and shut down. The start up and shut down order may be important for certain scenarios. For example, the start up order can determine if the applications are exposed to external traffic or not, and when the associated traffic can be reached via an external interface.

In sum, the techniques described herein provide for operating a software router in application memory space of a general purpose computer, where the software router is configured to route network traffic between applications operating in the application memory space, and between the application and network interfaces external to the general purpose computer. An application is operated in the application memory space of the general purpose computer. A connection is established with an operating system device configured to route packets between the application and the software router. Network traffic is routed by the software router for network traffic to and from the application by way of the connection.

The general purpose computer is in communication with one or more of a local area network (LAN), a mobile LAN, personal area network (PAN) and a wide area network (WAN) to provide a flexible communication architecture for operating a software router, whether or not any of the network connections of the general purpose computer are wired or wireless.

The connection may be configured to send Ethernet frames from the software router to the application using a standard write operation of an operating system of the general purpose computer and receive Ethernet frames at the software router from the application using a standard read operation of the operating system, and send and receive layer 3 packets to and from the application using standard socket operations of the operating system.

An Internet Protocol (IP) address may be assigned to the connection and the to software router such that the connection and the software router are part of the same IP subnet. A default route may be assigned to the connection that points to the software router. All network interfaces may be specified as unnumbered on the general purpose computer, and data for the software router may be defined comprising network address translation information.

The above description is intended by way of example only.

What is claimed is:

1. A method comprising:
    operating a software router in application memory space of a general purpose computer, wherein the software router is configured to route network traffic between applications operating in the application memory space, and between the applications and network interfaces external to the general purpose computer;
    operating an application in the application memory space of the general purpose computer;
    establishing a connection with an operating system that is configured to route packets between the application and the software router;
    assigning an Internet Protocol (IP) address to each of the connection and the software router, respectively, such that the connection and the software router are part of a same subnet; and
    routing, by the software router, network traffic to and from the application by way of the connection,
    wherein the connection is a network TAP interface that is established during a boot sequence of the general purpose computer and that is thereafter given a permanent persistent presence with respect to the operating system.

2. The method of claim 1, wherein routing comprises sending Ethernet frames from the software router to the application by way of the connection using a write operation of an operating system of the general purpose computer and receiving Ethernet frames at the software router from the application by way of the connection using a read operation of the operating system.

3. The method of claim 1, wherein the connection is configured to send and receive layer 3 frames to and from the application using socket operations of the operating system.

4. The method of claim 1, wherein the application comprises a locally connected application configured to exchange network traffic with the software router.

5. The method of claim 1, wherein the application comprises an externally connected application that is connected to the software router and a device outside of the general purpose computer, wherein the software router is configured to route network traffic to and from the externally connected application to the device.

6. The method of claim 1, further comprising one or more of assigning a default route on the connection that points to the software router; specifying at least one unnumbered hardware interface on the general purpose computer indicating that the software router is a pathway for network traffic to exit application memory space; and defining data for the software router comprising network address translation information.

7. The method of claim 1, further comprising one or more of performing crash support for the software router, performing crash support for the application, providing remote management connectivity and/or remote console connectivity, and establishing startup and shutdown processes to the operating system of the general purpose computer.

8. An apparatus comprising:
    a network interface unit configured to enable network communications over a network;
    a memory comprising an application memory space;
    a processor coupled to the network interface unit and to the memory, wherein the processor is configured to:
        operate a software router in the application memory space, wherein the software router is configured to route network traffic between applications operating in the application memory space, and between the applications and network interfaces external to the general purpose computer;
        operate an application in the application memory space of the general purpose computer;
        establish a connection with an operating system that is configured to route packets between the application and the software router;
        assign an Internet Protocol (IP) address to each of the connection and the software router, respectively, such that the connection and the software router are part of a same subnet; and
        route, by the software router, network traffic to and from the application by way of the connection,
    wherein the connection is a network TAP interface that is established during a boot sequence of the general purpose computer and that is thereafter given a permanent persistent presence with respect to the operating system.

9. The apparatus of claim 8, wherein the processor is configured to send Ethernet frames from the software router to the application by way of the connection using a write operation of an operating system of the general purpose computer and receive Ethernet frames at the software router from the application by way of the connection using a read operation of the operating system.

10. The apparatus of claim 8, wherein the connection is configured to send and receive layer 3 frames to and from the application using socket operations of the operating system.

11. The apparatus of claim 8, wherein the application comprises a locally connected application configured to exchange network traffic with the software router.

12. The apparatus of claim 8, wherein the application comprises an externally connected application that is connected to the software router and a device outside of the general purpose computer, wherein the software router is configured to route network traffic to and from the externally connected application to the device.

13. The apparatus of claim 8, wherein the processor is further configured to assign a default route on the connection that points to the software router; specify at least one unnumbered hardware interface on the general purpose computer indicating that the software router is a pathway for network traffic to exit application memory space; and define data for the software router comprising network address translation information.

14. The apparatus of claim 8, wherein the processor is further configured to perform crash support for the software router, perform crash support for the application, provide remote management connectivity and/or remote console connectivity, and establish startup and shutdown processes for the operating system of the general purpose computer.

15. One or more non-transitory computer readable storage media encoded with software comprising computer executable instructions and when the software is executed operable to:

operate a software router in the application memory space, wherein the software router is configured to route network traffic between applications operating in the application memory space, and between the applications and network interfaces external to the general purpose computer;

operate an application in the application memory space of the general purpose computer;

establish a connection with an operating system that is configured to route packets between the application and the software router;

assign an Internet Protocol (IP) address to each of the connection and the software router, respectively, such that the connection and the software router are part of a same subnet; and route, by the software router, network traffic to and from the application by way of the connection, wherein the connection is a network TAP interface that is established during a boot sequence of the general purpose computer and that is thereafter given a permanent persistent presence with respect to the operating system.

16. The non-transitory computer readable storage media of claim 15, wherein the computer executable instructions that route comprise instructions configured to send Ethernet frames from the software router to the application by way of the connection using a write operation of an operating system of the general purpose computer and receive Ethernet frames at the software router from the application by way of the connection using a read operation of the operating system.

17. The non-transitory computer readable storage media of claim 15, wherein the computer executable instructions that establish the connection comprise instructions configured to send and receive layer 3 frames to and from the application using socket operations of the operating system.

18. The non-transitory computer readable storage media of claim 15, wherein the application comprises a locally connected application configured to exchange network traffic with the software router.

19. The non-transitory computer readable storage media of claim 15, wherein the application comprises an externally connected application that is connected to the software router and a device outside of the general purpose computer, wherein the software router is configured to route network traffic to and from the externally connected application to the device.

20. The non-transitory computer readable storage media of claim 15, wherein the computer executable instructions, when executed are further operable to assign a default route on the connection that points to the software router; specify at least one unnumbered hardware interface on the general purpose computer indicating that the software router is a pathway for network traffic to exit application memory space; and define data for the software router comprising network address translation information.

* * * * *